United States Patent
Boe (10) Patent No.: US 6,533,219 B2
(45) Date of Patent: Mar. 18, 2003

(54) PROCESS AND DEVICE FOR DETECTING THE LIFT-OFF OF AN AIRCRAFT IN THE COURSE OF TAKE-OFF

(75) Inventor: Regis Boe, La Salvetat Saint Gilles (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 09/960,527

(22) Filed: Sep. 24, 2001

(65) Prior Publication Data

US 2002/0079403 A1 Jun. 27, 2002

(30) Foreign Application Priority Data

Nov. 14, 2000 (FR) .............................. 00 14606

(51) Int. Cl.⁷ .............................................. B64C 25/02
(52) U.S. Cl. .................................. 244/100 R; 244/1 R
(58) Field of Search ............................ 244/100 R, 1 R; 701/15; 340/959

(56) References Cited

U.S. PATENT DOCUMENTS

| | | |
|---|---|---|
| 3,493,082 A | 2/1970 | Bell |
| 3,979,717 A | 9/1976 | Barnum et al. |
| 5,527,002 A | 6/1996 | Bilange et al. |
| 5,826,833 A * | 10/1998 | Evans et al. ................. 244/183 |
| 6,121,899 A * | 9/2000 | Theriault ..................... 340/946 |

FOREIGN PATENT DOCUMENTS

| | | | |
|---|---|---|---|
| EP | 0319051 | 6/1989 | |
| FR | 2547275 | 12/1984 | |
| GB | 2149373 A | * 6/1985 | ........... B64C/00/00 |

* cited by examiner

Primary Examiner—Peter M. Poon
Assistant Examiner—Timothy D. Collins
(74) Attorney, Agent, or Firm—Stevens, Davis, Miller & Mosher, LLP (57) ABSTRACT

A process and device are disclosed for detecting the lift-off of an aircraft during the course of take-off. Both during a phase of rolling down the runway and a take-off phase, the quantity $A=K.h+\theta$ is calculated. In this equation, $\theta$ is the longitudinal attitude of the aircraft, h is the height of the aircraft's tail skid, and K is a constant. After the value of A is calculated for the rolling phase, it is stored. The take-off phase of the aircraft is determined by detecting a particular difference between the stored value of A and a current calculation of A.

10 Claims, 5 Drawing Sheets

PROCESS AND DEVICE FOR DETECTING THE LIFT-OFF OF AN AIRCRAFT IN THE COURSE OF TAKE-OFF

The present invention relates to a process and a device for detecting the lift-off of an aircraft in the course of take-off.

It is known that the take-off procedure for an aircraft essentially comprises a phase of rolling along the ground followed by a lift-off phase. In the course of the rolling phase, the speed, the longitudinal attitude and the lift of the aircraft increase progressively, thereby partly unloading the landing gear of said aircraft, compressed by the mass of the aircraft. However, when the aircraft, at the end of the rolling phase, begins its lift-off phase, that is to say leaves the ground, said landing gear is completely unloaded of the mass of the aircraft, so that it relaxes significantly.

Also, it is easy to detect the lift-off of an aircraft in the course of take-off by measuring the elongation of said landing gear or else the crushing stresses to which it is subjected.

However, especially on account of the hydraulic damping of said landing gear, a device for detecting the lift-off of an aircraft, based on observation of said gear, cannot provide a response which is fast enough to be usable in a reliable manner in the course of the take-off procedure.

The main object of the present invention is to remedy this drawback and to make it possible to obtain in real time the information that the wheels of an aircraft taking off are leaving the ground.

Accordingly, according to the invention, the process for detecting the lift-off of an aircraft in the course of take-off, is noteworthy in that:

in the course of the take-off procedure, both during the phase of rolling along the ground and during the lift-off phase, the quantity $A = K \cdot h + \theta$ is calculated, in which:

$\theta$ represents the longitudinal attitude of the aircraft, h represents the height, with respect to the ground, of the zone of the tail of said aircraft which would touch the ground if the longitudinal attitude $\theta$ were to take too high a value during take-off, and K is a constant equal to the inverse of the longitudinal distance separating said tail zone from the articulations of the landing gear of said aircraft thereon;

the value of said quantity calculated during at least part of said rolling phase is stored;

said stored value is compared with the actual value in the course of calculation, of said quantity; and said lift-off is detected by the fact that said actual value becomes greater than said stored value.

Thus, through the implementation of the process in accordance with the present invention, it is possible to obtain the lift-off detection information in real time. The process of the present invention is based on the finding by the applicant that the quantity A remains almost constant during said rolling phase, but grows rapidly and steeply when the wheels of the aircraft leave the ground, at the start of the lift-off of said aircraft.

It is therefore seen that, according to the present invention, the constant value of the quantity A during the rolling phase, frozen and stored, serves as reference for the calculations. It is with this constant frozen value that the growing value of the quantity A will be compared, after the lift-off of the aircraft.

In order to avoid the nuisance effects of measurement noise the value of said quantity calculated during at least part of the rolling phase is averaged before storage. Such averaging can be performed throughout the duration of the rolling phase. However, it may advantageously begin from the moment at which the aircraft reaches while rolling a predetermined speed, for example that from which the aircraft's on-board computers provide credible information.

Preferably, although it can be carried out at any moment of the rolling phase subsequent to the averaging, the storage of said value of the quantity calculated during at least part of said rolling phase is performed, at the latest, at the instant at which said aircraft reaches while rolling the speed of rotation, that is to say the speed at which the pilot of the aircraft begins to pull back on the stick with a view to lift-off.

Furthermore, for safety, it is preferable to add a safety margin to said stored value, before comparing the latter with said actual value in the course of calculation.

For the implementation of the process according to the invention, there is a provided a device comprising:

means for measuring the longitudinal attitude $\theta$ of said aircraft;

means for determining the height h, with respect to the ground, of the zone of the tail of said aircraft which would touch the ground if the longitudinal attitude $\theta$ were to take too high a value during take-off;

means for calculating in the course of the take-off procedure, both during the phase of rolling along the ground and during the lift-off phase, the quantity $A = K \cdot h + \theta$, in which K is a constant equal to the inverse of the longitudinal distance separating said tail zone from the articulations of the landing gear of said aircraft thereon;

means of storage of the value of said quantity calculated during at least part of said rolling phase; and means of comparison of said stored value with the actual value, in the course of calculation, of said quantity, said means of comparison delivering at their output a comparison signal which takes one or the other of two distinct values, such that:

the first of these values, which is representative of the phase of rolling of the aircraft along the ground, results from the fact that said stored value and said actual value are at least approximately equal;

the second of these values, which is representative of the lift-off of said aircraft, results from the fact that said actual value has become greater than said stored value.

It is then advantageous for said device to comprise:

means for averaging by filtering, disposed between said means of calculation and said means of storage; and an adder intended to add said safety margin to said stored value and disposed between said means of storage and said means of comparison.

It will readily be understood that, in order to utilize said comparison signal, the device according to the present invention can comprise means of utilization receiving said comparison signal and generating, from the values of the latter, limit values of longitudinal attitude for said aircraft. In this case, the device in accordance with the present invention can constitute an aid to the take-off of the aircraft by making it possible to prevent the tail thereof from touching the ground in the course of the take-off procedure.

It is known in fact that, during take-off and under cetain conditions, the tail of an aircraft may be apt to strike the ground. Also, thought has already been given to protecting the tail of the aircraft against damage which may result therefrom, for example by installing a protective skid, and also to warning the pilot of the proximity of the ground.

For example, documents U.S. Pat. No. 3,493,082 and EP 0 319 051 describe protection tailskids, able to absorb the energy of any shock so as to protect the fuselage from damage. Such skids consist of passive mechanical devices, which of course serve only in the case of actual touching of the ground by the tail. For their part, documents U.S. Pat. No. 3,979,717 and FR 2 547 275 describe alert systems warning the pilot of the proximity of the ground, said pilot then having to act rapidly to avoid the tail touching.

Depending on the nature of his means of utilization, the present invention can provide the pilot with an indication, audible and/or visual, delimiting an advised take-off domain in which there is no possibility of the tail touching. Moreover, if said means of utilization consist of flight computers of the aircraft, they can automatically manage the dynamics of the aircraft in the take-off phase, by utilizing said comparison signal. Thus, within the framework of the present invention, it is therefore not a matter of intervening in the event of the tailskid touching (as in the documents U.S. Pat. No. 3,493,082 and EP 0 319 051), nor of warning the pilot that his aircraft is in a critical position with respect to the ground (as in the documents U.S. Pat. No. 3,979,717 and FR 2 547 275).

The implementation of the device of the invention as a take-off aid is simple because said comparison signal is representative of the take-off phase in the course of execution and since it can be used to anticipate a possible touching of the ground by the tail and indicate to the pilot or to on-board computers a longitudinal attitude limit not to be exceeded, appropriate to the take-off phase in the course of implementation.

In the usual case where said aircraft is equipped with at least one monitoring screen indicating the longitudinal attitudes of said aircraft, an exemplary embodiment of said means of utilization of the device in accordance with the present invention can comprise means for consecutively displaying, on said monitoring screen during take-off:

firstly a first limit value of longitudinal attitude not to be exceeded for said aircraft during the rolling phase, said first limit value being associated with said first value of the comparison signal; then, a second limit value of longitudinal attitude not to be exceeded for said aircraft during the lift-off of the latter, said second limit value being greater than said first limit value and being associated with said second value of the comparison signal.

Of course, to permit the toggling of the display on the monitoring screen from said first limit value to said second limit value, it is necessary to make certain that particular conditions specific to the take-off of the aircraft all hold. Also, according to another feature of the present invention, there are provided means permitting the replacement, on said monitoring screen of the display of said first limit value by the display of said second limit value only if a take-off is actually about to occur.

To determine whether a take-off is actually about to occur, it is possible, for example, to detect the position of the throttle so as to verify that it is in the "take-off" position.

Furthermore, in order to fix the take-off domain in which the device in accordance with the present invention is active, it is possible to provide means permitting the display of said second limit value only so long as said current instantaneous calculated value of said quantity A is less than a predetermined value, representative of the fact that the aircraft is clear of the ground, take-off having been completed, and/or only so long as the landing gear of the aircraft is not fully relaxed. Specifically, once clear of the ground, the longitudinal attitude indication is no longer required by the pilot. It could even be an annoyance to the pilot. Moreover, the monitoring screens of an aircraft control station being very dense in terms of information, it is preferable not to maintain the display of said second limit value, while it is no longer useful. It is therefore desirable to remove the latter when any risk of the tail touching is eliminated.

Preferably, the information respectively representative of the fact that a take-off is about to occur, that the lift-off of the aircraft has taken place and that the aircraft is clear of the ground are applied through an AND-type logic gate. Thus, when at least one of these three pieces of information does not exist, the display of said second threshold value does not take place.

When the conditions permitting the display of said second threshold value as replacement for said first all hold, the transition is preferably progressive so as to take account of the rotational dynamics of the aircraft. It may for example be done continuously in a time corresponding to a nominal rate of rotation (variation of longitudinal attitude) for a take-off, for example 2 seconds.

The figures of the appended drawing will elucidate the manner in which the invention may be embodied. In these figures, identical references designate similar elements.

Figure 1A:
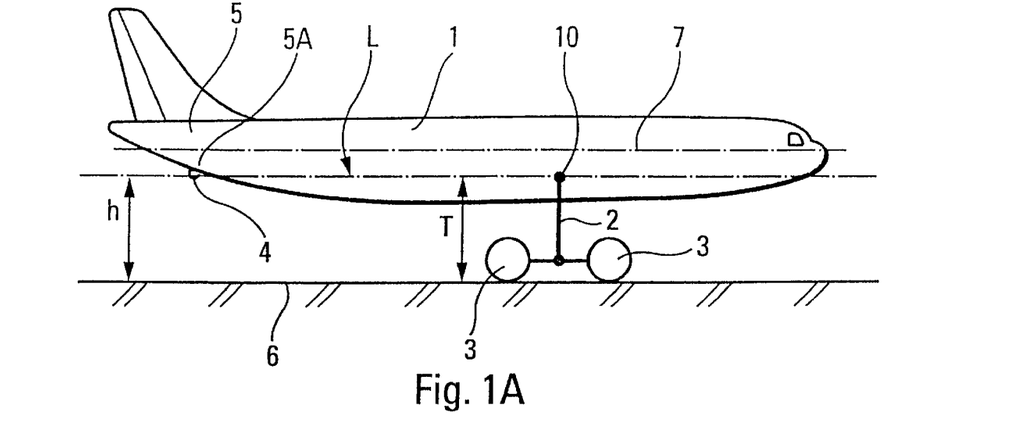
FIG. 1A diagrammatically illustrates an aircraft rolling along the ground, at the start of the rolling phase during the take-off procedure.
Figure 1B:
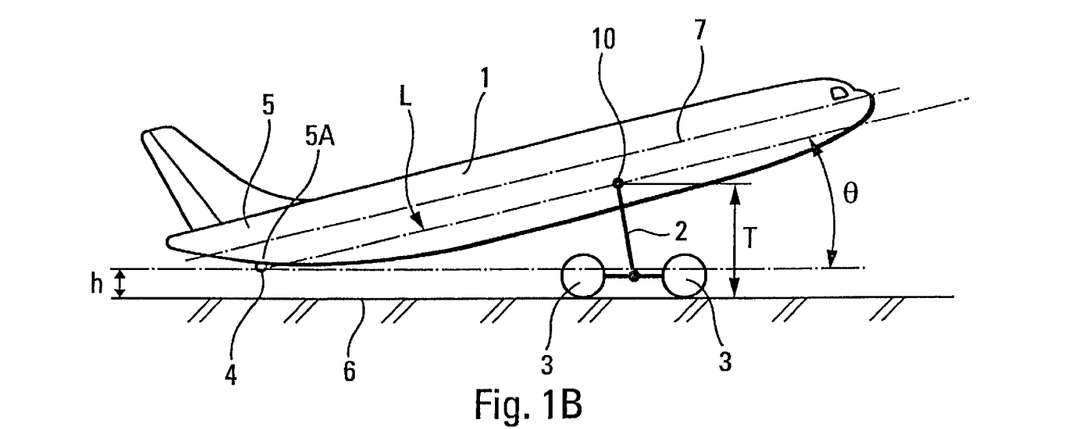
FIGS. 1B and 1C illustrate, in views similar to that of FIG. 1A, said aircraft respectively during its rolling run prior to lift-off and just after its lift-off, its wheels having then left the ground.
Figure 1C:
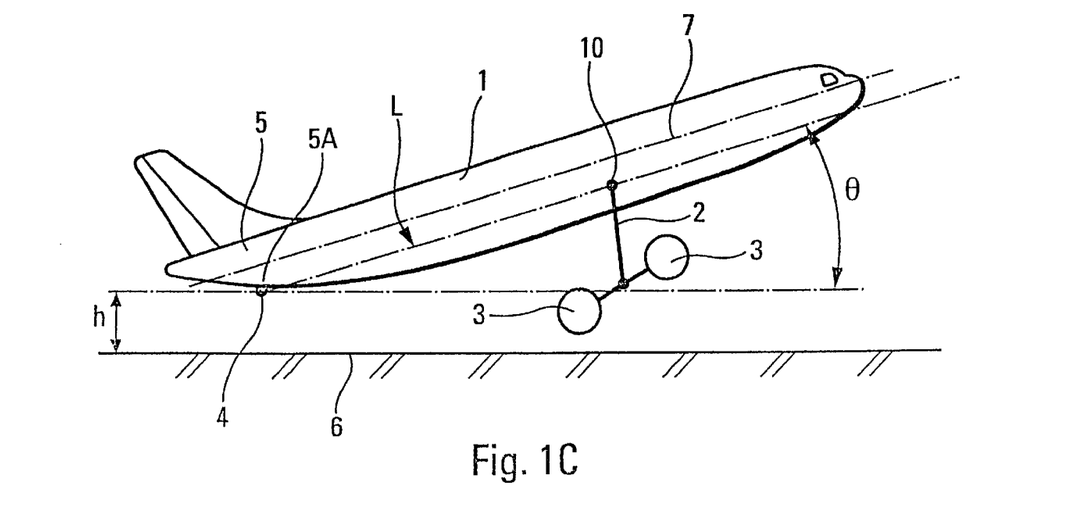

In FIGS. 1A, 1B and 1C there is represented an aircraft 1 provided with two landing gears 2, disposed side by side and equipped with wheels 3. The aircraft 1 moreover comprises, as is standard, a protection skid 4 disposed under its tail 5 and intended to come exceptionally into contact with the ground 6, should the longitudinal attitude $\theta$ of the aircraft 1 take too large a value in the course of take-off. This protection skid 4 demarcates the zone 5A of the tail 5 liable to touch the ground during take-off. In these figures, the median longitudinal plane 7 of the aircraft 1 has also been represented.

Moreover, the aircraft 1 comprises, in its control cabin, a monitoring screen 9 (see FIGS. 2A, 2B and 2C) on which is displayed a mobile symbol 8, representative of said aircraft 1.

Figure 3:
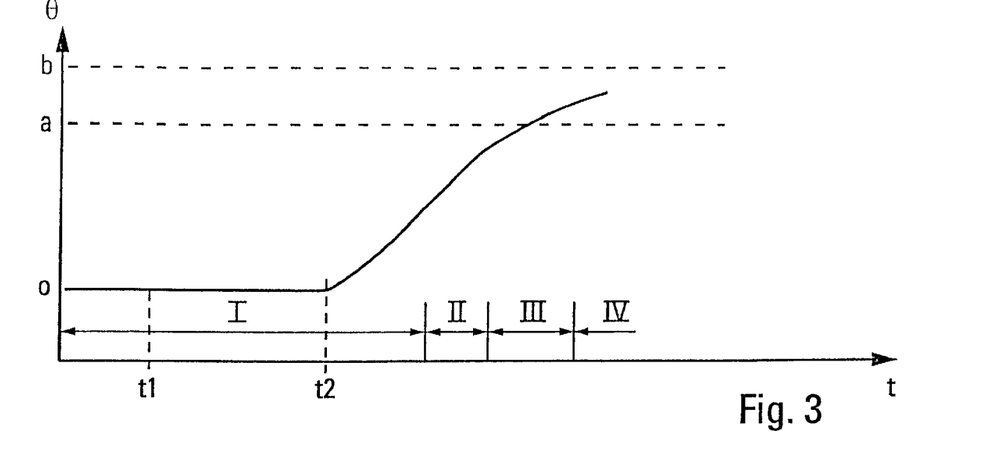
FIG. 3 is a chart illustrating, as a function of time t, the variation of the longitudinal attitude $\theta$ of said aircraft during the take-off procedure.

As is known, the take-off of the aircraft 1 is broken down into two successive main phases, namely a rolling phase and a lift-off phase, which can themselves be subdivided chronologically into two steps, as is illustrated in FIG. 3 which represents the profile of the attitude $\theta$ of the aircraft 1 as a function of time t during take-off. In this figure, the steps of the start and of the end of the rolling phase are indicated respectively by the references I and II, whilst the steps of the start and of the end of the lift-off phase are referenced III and IV, respectively.

During step I of start of the rolling phase (see FIGS. 1A, 2A and 3), the aircraft 1 rolls along the ground 6 with its landing gear 2 compressed by its mass and with a substantially zero longitudinal attitude, so that, on the monitoring screen 9, the symbol 8 of the aircraft 1 is substantially merged with the artificial horizon line H displayed on said screen. In this situation, the height h of the skid 4 with respect to the ground 6 is substantially equal to the height T of the landing gear 2.

Figure 2A:
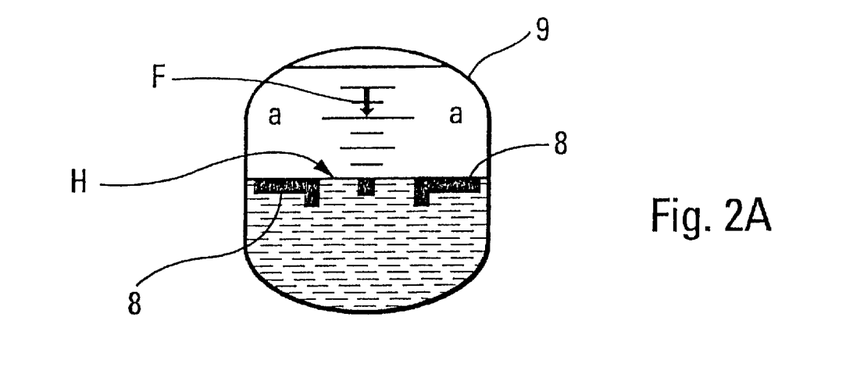
FIGS. 2A, 2B, 2C diagrammatically show a monitoring screen of said aircraft, respectively illustrating three situations in correspondence with FIGS. 1A, 1B and 1C.
Figure 2B:
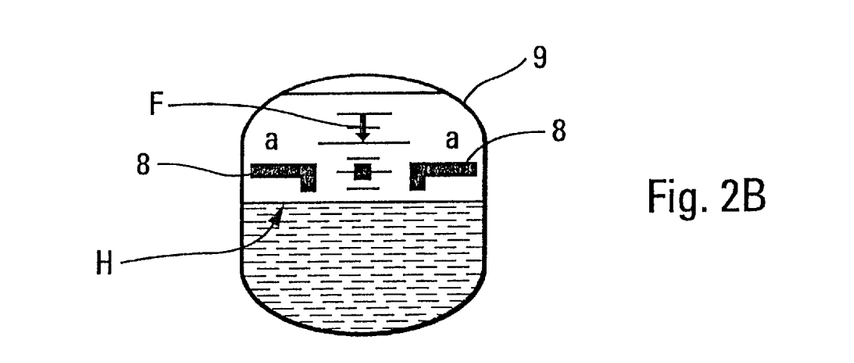

At the end of step I, the speed of the aircraft 1 having increased, the attitude θ of the latter begins to grow, so that the symbol 8 of the aircraft 1 rises progressively above said artifical horizon line H (see FIGS. 1B, 2B and 3). The growth of the attitude θ of the aircraft 1 continues during step II of end of the rolling phase and the symbol 8 continues to rise above the line H. At the end of step II, the aircraft 1 leaves the ground 6 and the landing gear 2 relaxes significantly.

Figure 2C:
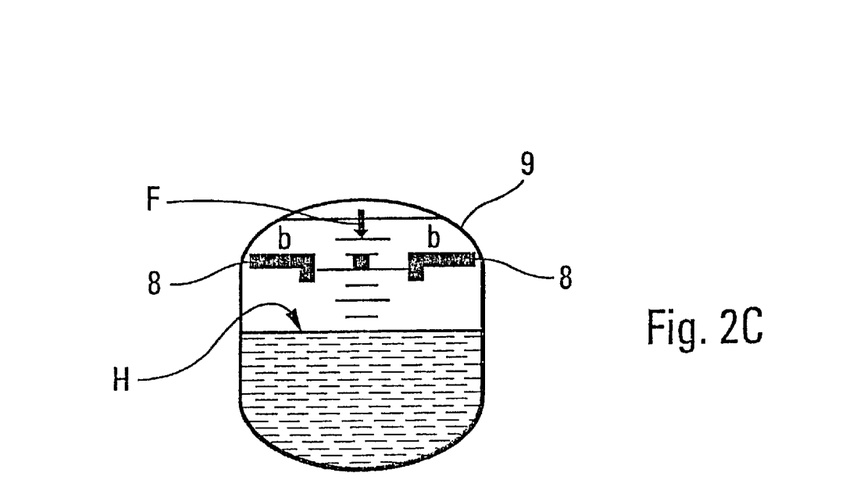

Onward of step III of start of the lift-off phase, the aircraft 1 gains altitude, so that the symbol 8 of the aircraft 1 deviates more and more from said line H (see FIGS. 1C, 2C and 3).

It will be noted that, during the rolling phase I, II, the longitudinal attitude θ which the aircraft 1 can take is limited by the geometrical characteristics of said aircraft and, in particular, by the height h of the tailskid 4: if the pilot pulls back excessively on the stick of the aircraft, the tailskid 4 is at risk of touching the ground 6.

If L denotes the longitudinal length separating the tailskid 4 from the upper articulations 10 of the landing gear 2, it is found that, during said rolling phase I, II (FIGS. 1A and 1B), the height T of said landing gear is equal to h+L. tan θ. Now, the longitudinal attitude θ remaining small, we can write T=h+L. θ or A=K. h+θ by calling $$\frac{T}{L} = A \text{ and } \frac{1}{L} = K$$

Of course, in this last expression, the parameter K is constant, since the length L is itself constant.

Moreover, the applicant has found that, during the whole of step I of start of said rolling phase, including the initial phase of rotation at take-off (around the instant t2 in FIG. 3), the quantity A remains almost constant itself. This is due to the fact that, so long as the landing gear 2 has not begun to relax significantly, the increase in the longitudinal attitude θ compensates for the reduction in the height h of the tailskid 4.

On the other hand, when take-off goes to step III of start of the lift-off phase, the aircraft 1 begins to gain altitutde, this bringing about the increasing of the quantity A through the combined effect of the gaining of longitudinal attitude and the gaining of altitude.

The take-off aid device in accordance with the present invention is based on these findings.

Figure 4:
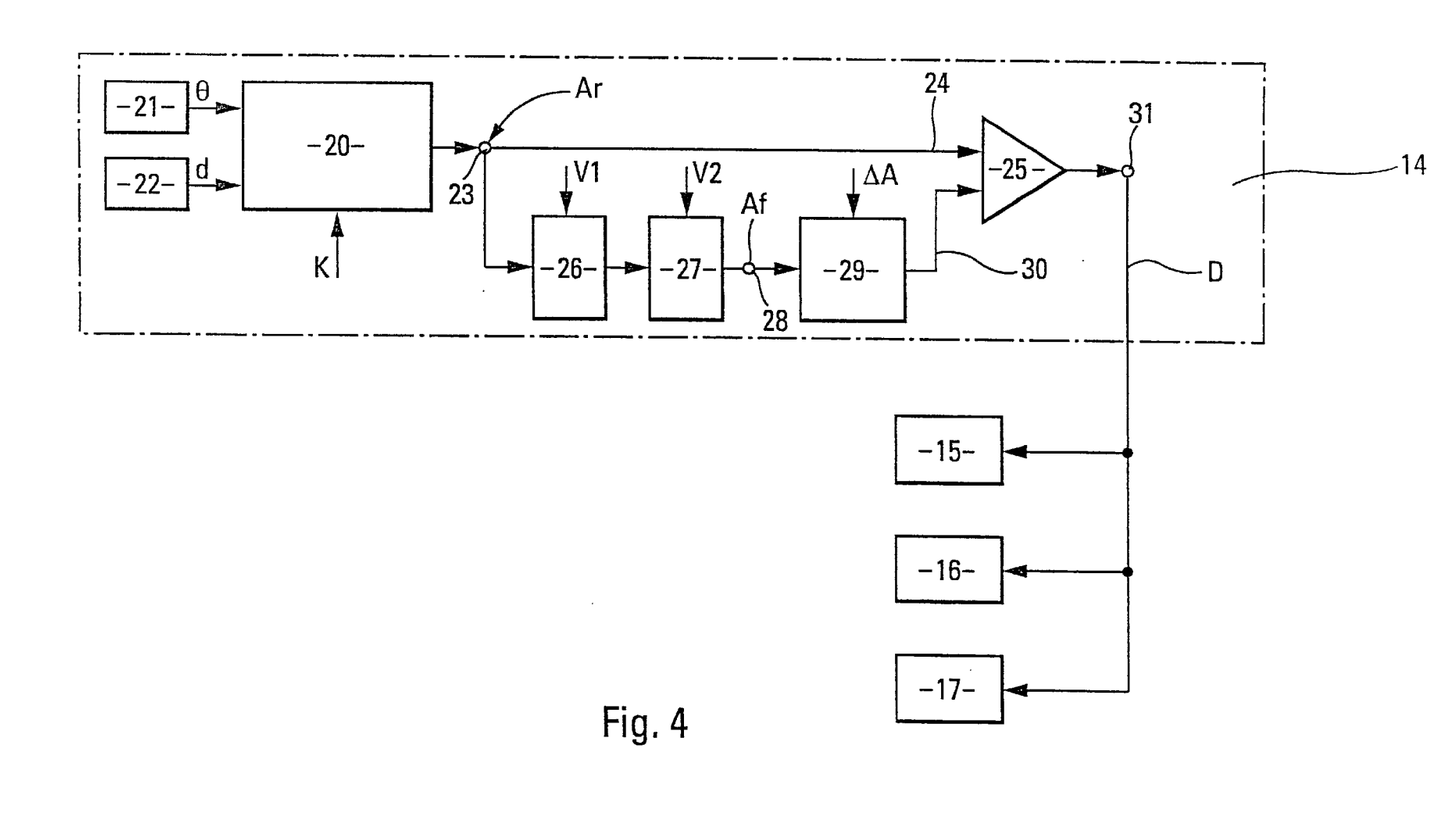
FIG. 4 is the schematic diagram of an embodiment of the device according to the present invention.

In the diagrammatic exemplary embodiment 14, illustrated schematically in FIG. 4, the device according to the present invention comprises a computer 20 receiving, in addition to the parameter K, the measurement of the longitudinal attitude θ of the aircraft 1 as delivered by an attitude sensor 21, as well as a measurement d of distance between a point of the aircraft 1 and the ground 6, as delivered by a sensor 22. For example, the sensor 22 may be a radioaltimeter. If this radioaltimeter is disposed at the location of the tailskid 4, the measurement d is that of the height h of said tailskid. If the radioaltimeter is disposed at some other location of the aircraft 1, it is easy for the calculator 20 to deduce the estimate of h from the measurement d, given the attitude θ and the longitudinal distance between the location of said radioaltimeter and said tailskid. For example, if the sensor (radioaltimeter) 22 is disposed at the level of the landing gear 2 so that the measurement d is equal to T, it is obvious that h=d−L.tan θ.

Thus, knowing h, θ and K, the computer 20 can easily calculate the quantity A=K. h+θ and deliver the current instantaneous value thereof (actual value) Ar on its output terminal 23. The latter is linked to one of the inputs 24 of a comparator 25, so as to transmit said actual value Ar to this comparator.

Moreover, said output terminal 23 of the computer 20 is linked to the input of a filter 26, where it is averaged by filtering from the instant t1 at which the aircraft 1 reaches while rolling a predetermined speed V1 (see FIG. 3). The filtered value Af, resulting from the filtering of the actual value Ar by the filter 26, is then stored, at an instant t2 at which the aircraft 1 reaches a speed V2, greater than V1, in a memory 27, at the output 28 of which it is available. This output 28 is linked to an adder 29, in which a safety margin ΔA is added to the filtered value Af. The output of the adder 29 is linked to the other input 30 of the comparator 25. Advantageously, the speed V2 is chosen so as to be the speed of rotation of the aircraft 1.

Figure 5:
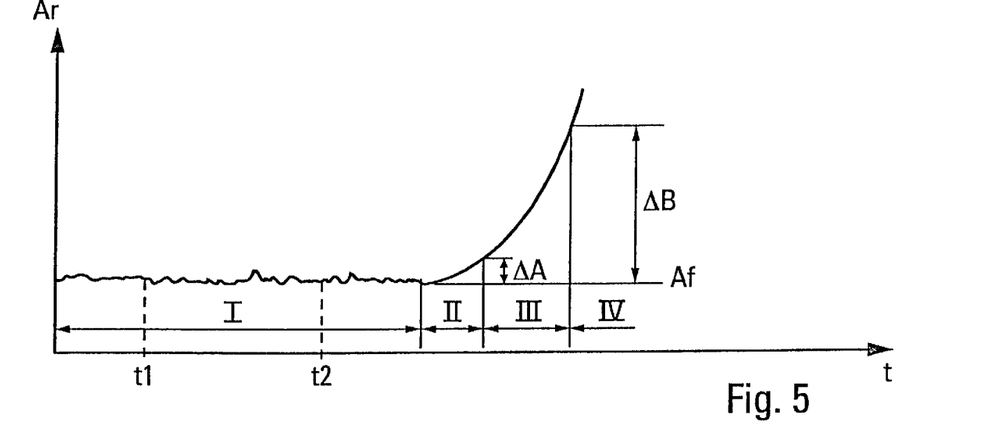
FIG. 5 is a chart illustrating, as a function of time t, the function calculated by the device in accordance with the present invention, during the take-off procedure.

As is illustrated diagrammatically in FIG. 5, the actual calculated value Ar of the quantity A is constant throughout the step of the start I of the rolling phase, but grows rapidly and steeply onward of step II of end of said rolling phase and during the lift-off phase III, IV.

Thus, during the take-off procedure, the comparator 25 compares the actual value Ar with the reference value Af+ΔA. It will be noted that the margin ΔA makes it possible, not only to prevent the nuisance toggling of the comparator 25 should the actual value Ar be very noisy, but also to detect that the lift-off phase has begun and that the pilot of the aircraft 1 will be able to increase the longitudinal attitude θ of said aircraft.

At the output 31 of the comparator 25 there therefore appears a comparison signal D which can take one or the other of two distinct values D1 or D2:

so long as the actual value Ar is substantially equal to the reference value Af+ΔA, the comparison signal D takes its first value D1, which is then representative of the rolling phase;

but when the actual value Ar becomes greater than the reference value Af+ΔA, the comparison signal takes the second value D2, which is then representative of the lift-off phase.

Thus, the toggling of the signal D, from its first value D1 to its second value D2, is representative of the lift-off of the aircraft 1.

To utilize such lift-off information, the output 31 can be linked to various utilization devices, such as a visual alarm 15, an audible alarm 16, or else to a flight control computer 17 able to manage the dynamics of the aircraft 1 during the take-off procedure.

Figure 6:
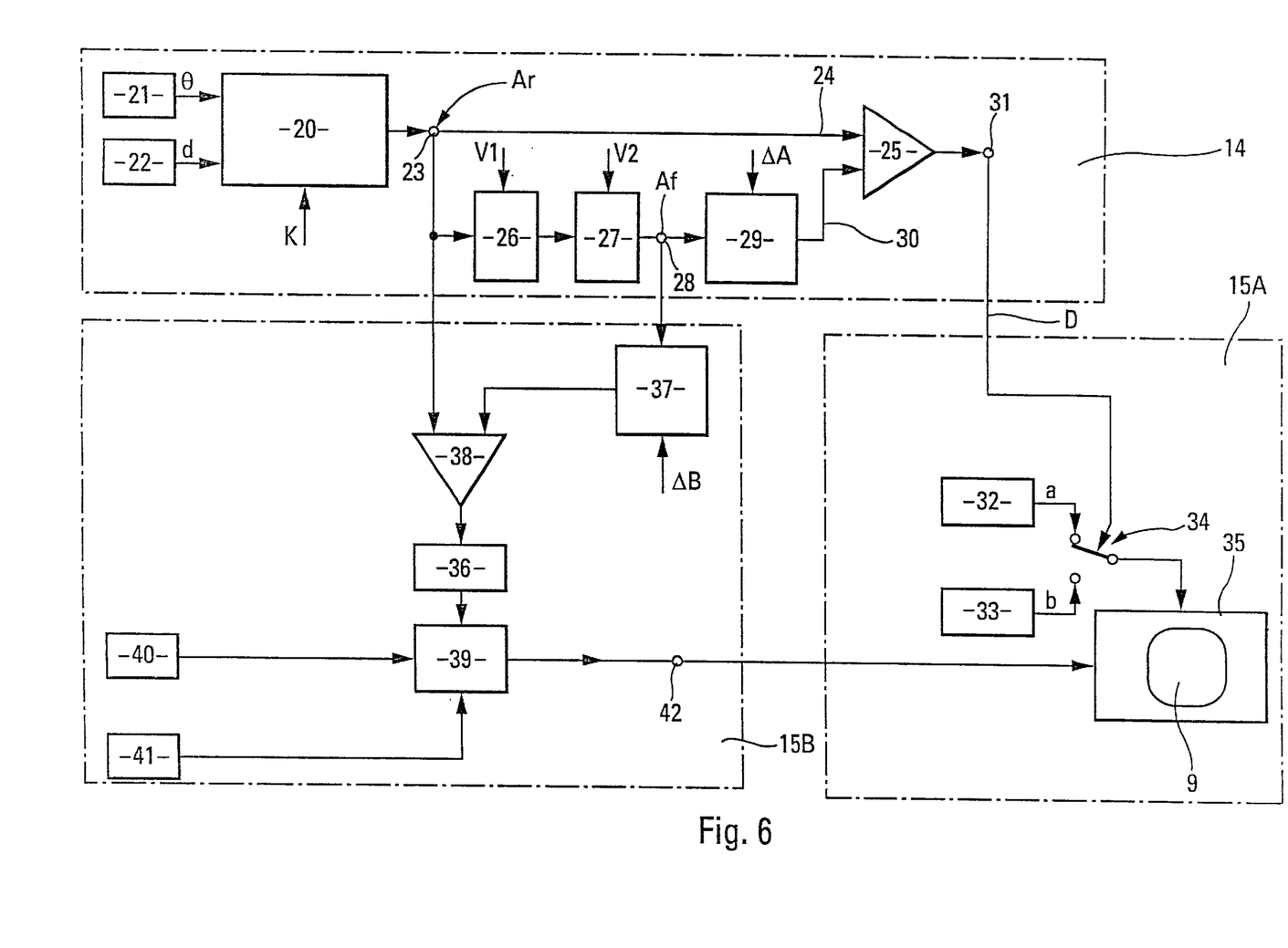
FIG. 6 shows the schematic diagram of a device in accordance with the present invention, able to deliver limit values of longitudinal attitude during the take-off procedure.

Represented in FIG. 6 is the device 14 associated with a visual alarm 15 consisting of a limit longitudinal attitude display 15A and of control logic 15B and using the monitoring screen 9 mentioned hereinabove.

The limit longitudinal attitude display 15A comprises two generators 32 and 33, producing two distinct voltages, respectively representative of two limit values a and b for the longitudinal attitude θ, these limit values being preset and respectively appropriate to the characteristics of the aircraft 1 during the rolling and lift-off phases. A switch 34, controlled by the comparison signal D present on the output 31 of the comparator 25, makes it possible to transmit one or the other of said values a and b to a display apparatus 35, of which the screen 9 forms part.

The control logic 15B comprises an adder 37 receiving, on the one hand, the filtered value Af available on the output 28 of the memory 27 and on the other hand, a limit value or margin ΔB of the quantity Ar with respect to the reference Af (see FIG. 5). This limit value ΔB is such that the sum Af+ΔB carried out by the adder 37 is representative of the fact that the aircraft 1 has succeeded with its take-off and is clear of the ground, the landing gear 2 being completely relaxed. In a comparator 38, the sum Af+ΔB is compared with the actual value Ar, available on the output 23 of the computer 20. The result of this comparison is addressed, by way of an inverter 36, to one of the three inputs of an AND gate 39, the other two inputs of which are respectively linked to a detector 40 verifying the position of the throttle 40 of the aircraft 1 and to a timed-out detector 41, monitoring the length of the landing gear 2. Hence, a signal representative of the coincidence of the signals originating from the comparator 38 and the detectors 40 and 41 is available at the output 42 of the gate 39.

Figure 7:
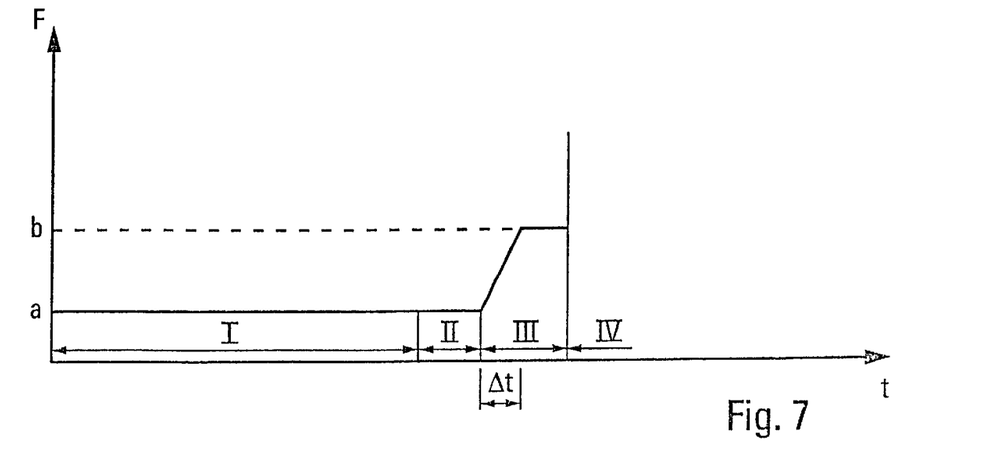
FIG. 7 illustrates, as a function of time t, the display of said limit values of longitudinal attitude.

The manner of operation of the device of FIG. 6 is as follows (see also FIG. 7):

I—During step I of start of the rolling phase (see FIGS. 1A and 2A), the signal D takes its value D1 representative of rolling, but no signal appears at the output 42 of the gate 39, since the detector 41 indicates that the landing gear is compressed. The switch 34 is in the position represented in FIG. 6 for which it links the generator 32 to the monitoring screen 9. The latter therefore displays the smallest value of limit longitudinal attitude a, for example equal to 10°, as is indicated by the arrow F (FIG. 2A).

II—During step II of end of the rolling phase (see FIGS. 1B and 2B), the signal D retains its value D1. Subsequently, although the symbol 8 of the aircraft 1 gets further from the artificial horizon line H, the smaller of the two values of limit longitudinal attitude a continues to be displayed on the monitoring screen 9.

III—During stage III of start of the lift-off phase, the signal D toggles so as to take its value D2 representative of the lift-off of the aircraft 1, so that the switch 34 is actuated so as to toggle into its other position, for which it links the generator 33 to the monitoring screen 9. The arrow F then goes progressively, during the space of time Δt, from the position a to the position b (see FIG. 2C). The value of the longitudinal attitude b can for example be around 14°.

IV—Step IV of the lift-off phase having continued, either the detector 41 toggles, indicating that the landing gear 2 is no longer compressed, or the actual value Ar becomes greater than Af+ΔB. At one or the other of these moments, the output 42 of the gate 39 toggles, thus disabling the display of the arrow F, which disappears from the screen 9.

The numerical values for the attitudes a and b given hereinabove by way of example correspond to an aircraft 1 whose landing gear 2 is provided with a tilting bogie.

What is claimed is:

1. A process for detecting the lift-off of an aircraft in the course of take-off, comprising:

calculating, in the course of the take-off procedure, both during the phase of rolling along the ground and during the lift-off phase, the quantity A=K.h+θ, in which:

θ represents the longitudinal attitude of the aircraft, h represents the height, with respect to the ground, of a zone of the tail of said aircraft which would touch the ground if the longitudinal attitude θ were to take too high a value during take-off, and K is a constant equal to the inverse of the longitudinal distance separating said tail zone from articulations of landing gear of said aircraft thereon;

the value of said quantity calculated during at least part of said rolling phase is stored;

said stored value is compared with the actual value in the course of calculation, of said quantity; and said lift-off is detected by the fact that said actual value becomes greater than said stored value, wherein
the value of said quantity calculated during at least part of the rolling phase is averaged before storage.

2. The process as claimed in claim 1, wherein the storage of said value of the quantity calculated during at least part of said rolling phase is performed, at the latest, at the instant at which said aircraft reaches while rolling the speed of rotation.

3. The process as claimed in claim 1,
wherein a safety margin is added to said stored value, before comparing the latter with said actual value in the course of calculation.

4. A device for detecting the lift-off of an aircraft in the course of take-off, which device comprises:

means for measuring the longitudinal attitude θ of said aircraft;

means for determining the height h, with respect to the ground, of a zone of the tail of said aircraft which would touch the ground if the longitudinal attitude θ were to take too high a value during take-off;

means for calculating in the course of the take-off procedure, both during the phase of rolling along the ground and during the lift-off phase, the quantity A=K.h+θ, in which K is a constant equal to the inverse of the longitudinal distance separating said tail zone from articulations of landing gear of said aircraft thereon;

means of storage of the value of said quantity calculated during at least part of said rolling phase;

means of comparison of said stored value with the actual value, in the course of calculation, of said quantity, said means of comparison delivering at their output a comparison signal which takes one or the other of two distinct values, such that:
the first of these values results from the fact that said stored value and said actual value are at least approximately equal and is representative of the phase of rolling of the aircraft along the ground;
the second of these values results from the fact that said actual value has become greater than said stored value and is representative of the lift-off of said aircraft; and means for averaging by filtering, disposed between said means of calculation and said means of storage.

5. The device as claimed in claim 4,
which device comprises, between said means of storage and said means of comparison, an adder for adding a safety margin to said stored value.

6. The device as claimed in claim 4, which device comprises means of utilization receiving said comparison signal and generating, from the values of the latter, limit values of longitudinal attitude for said aircraft.

7. The device as claimed in claim 6, for an aircraft equipped with a monitoring screen indicating the longitudinal attitudes of said aircraft, which device comprises means for consecutively displaying, on said monitoring screen during take-off:

firstly a first limit value of longitudinal attitude not to be exceeded for said aircraft during the rolling phase, said first limit value being associated with said first value of the comparison signal; then, a second limit value of longitudinal attitude not to be exceeded for said aircraft during the lift-off of the latter, said second limit value being greater than said first limit value and being associated with said second value of the comparison signal.

8. The device as claimed in claim 7, which device comprises means permitting the replacement, on said monitoring screen of the display of said first limit value by the display of said second limit value only if a take-off is actually about to occur.

9. the device as claimed in claim 7, which device comprises means permitting the displaying of said second limit value only so long as said current instantaneous calculated value of said quantity is less than a predetermined value, represented of the fact that the aircraft is clear of the ground, take-off having been completed.

10. The device as claimed in claim 7, which device comprises means permitting the display of said second limit value only so long as the landing gear of the aircraft is not fully relaxed.

* * * * *